UNITED STATES PATENT OFFICE.

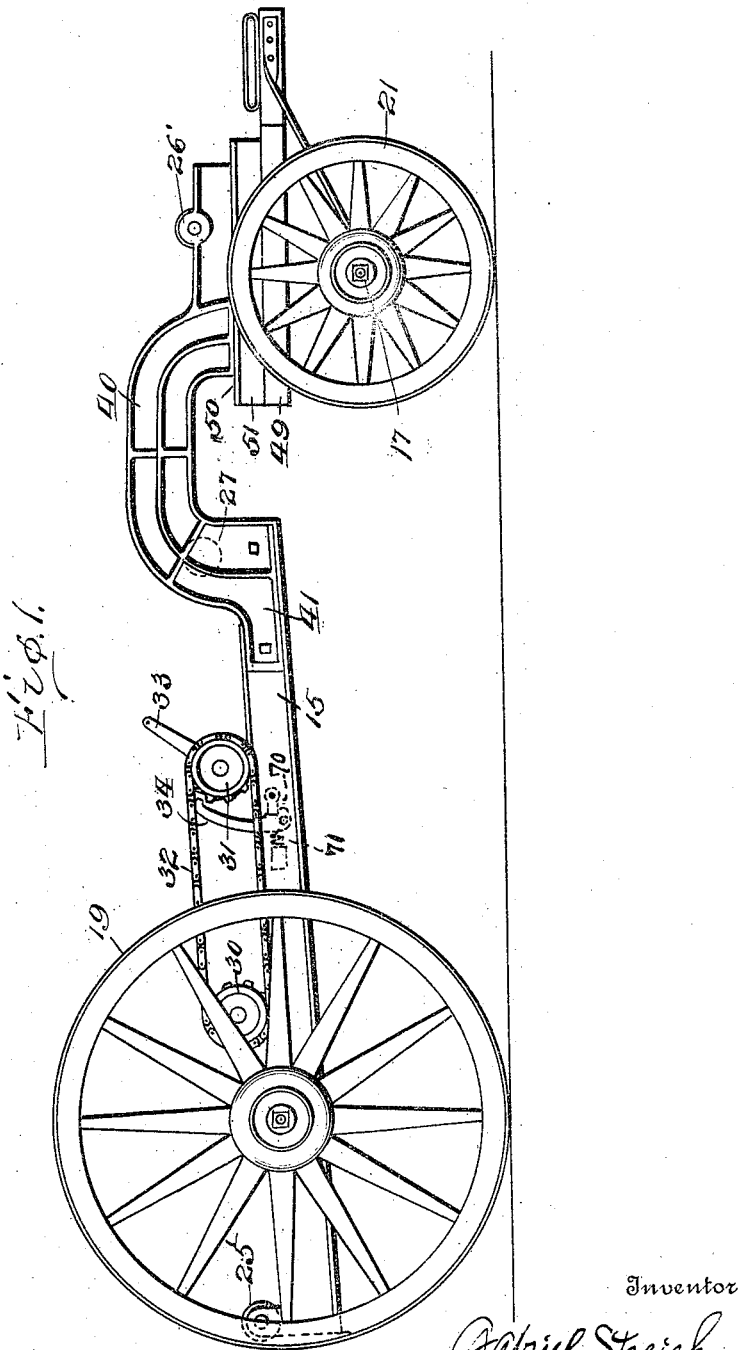

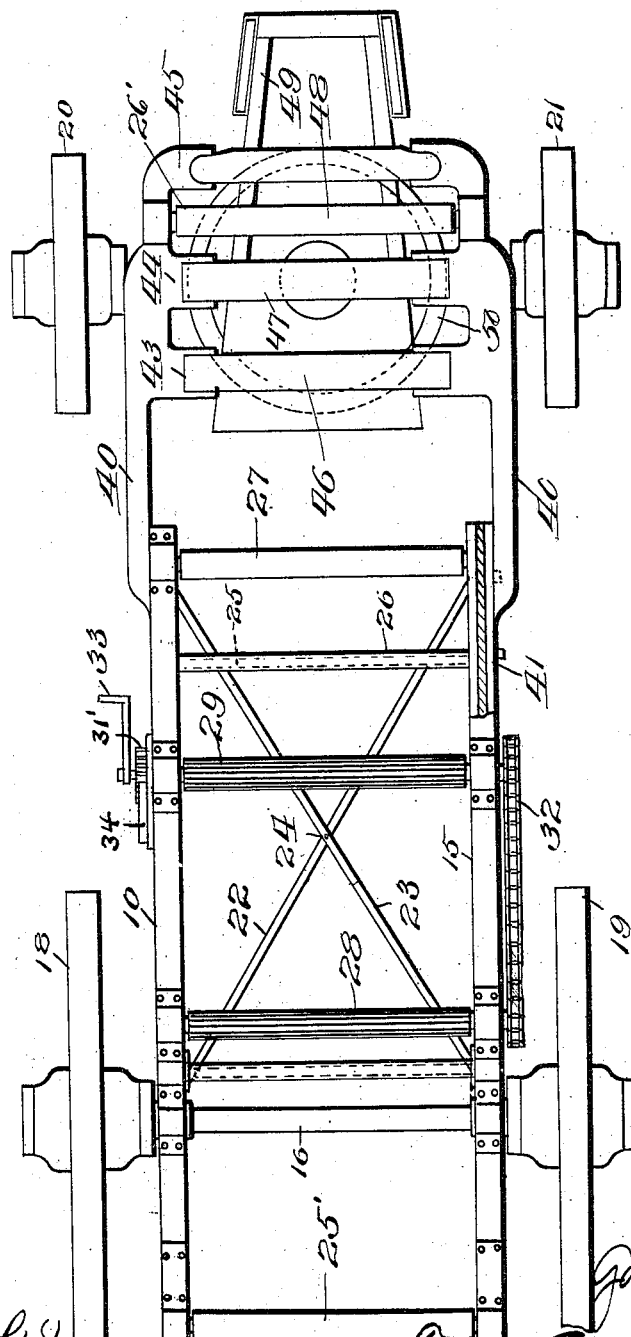

GABRIEL STREICH, OF OSHKOSH, WISCONSIN.

WAGON.

1,052,388. Specification of Letters Patent. Patented Feb. 4, 1913.

Application filed September 26, 1912. Serial No. 722,560.

*To all whom it may concern:*

Be it known that I, GABRIEL STREICH, a citizen of the United States, residing at Oshkosh, in the county of Winnebago and State of Wisconsin, have invented certain new and useful Improvements in Wagons; and I do hereby declare the following to be a full, clear, and exact description of the invention, such as will enable others skilled in the art to which it appertains to make and use the same.

This invention relates to wagons and especially to that class of wagons designed for carrying lumber.

An object is to provide an improved construction by means of which the load may be discharged in one compact pile by the operation through a crank or other similar connection of rollers arranged transversely of the frame or body. In order to carry this object into effect it is found necessary to mount the body much nearer the ground than heretofore, and to so construct the device as a whole that the lumber may be dropped gradually from the rear end of the wagon without causing the pile to separate. I accomplish this purpose by mounting the main frame or body below the rear axle and provide an arch near the front end for the accommodation of the wheels for making short turns in the alleys of a lumber yard. This arch is of novel construction and is mounted in a novel manner being fully described below.

In the drawings forming a part of this application—Figure 1 is a view of the wagon in side elevation. Fig. 2 is a top plan view.

The body portion of the wagon comprises a frame of I-beam construction, the side bars being indicated respectively by 10 and 15, the rear axle by 16 and the front axle by 17. The wheels of the rear axle are numbered respectively 18 and 19 and the forward wheels 20 and 21. The frame is braced in a special manner, it being sufficient at this time to call attention to the diagonally arranged braces or the rods 22 and 23 which are suitably connected at the point of crossing indicated by 24. The transverse bracing of the frame is effected by means of braces 25 carrying sleeves 26, the ends of which abut the inner sides of the I-beams, the braces or rods proper passing through the web of each beam and being suitably secured.

A plurality of rollers is provided for the purpose of supporting and rolling off the load of lumber. These rollers are somewhat differently mounted, the forward and rear rollers being mounted at a suitable elevation directly on the frame and certain intermediate rollers being also mounted on the side bars of the frame, but at a slightly greater elevation in order that the lumber may be positively engaged by the grooved or other surface of such intermediate rollers. Any suitable number of rollers may be provided, but I have shown a roller 25' at the rear, a roller 26' at the front, a roller 27 mounted adjacent the arched members referred to elsewhere, and rollers 28 and 29 suitably connected by means of wheels 30 and 31 and chain 32. The axle of wheel 31 is rotated by means of a crank 33 and motion is therefore imparted to the roller in the rear of roller 29, both rollers engaging not merely single pieces of lumber but the load as a whole and carrying the latter rearwardly until it is practically balanced on the rear roller 25. Owing to the manner of mounting the frame whereby the said frame is disposed at a suitable elevation above the ground, and not at a too great elevation, the pile is gradually dropped and retains its compact form, permitting of its easy disposition by means of any suitable mechanism employed for carrying it to the planing mill. Ratchet wheel 31' is engaged by a pawl 34 mounted on the bar 10 of the frame. The pawl is held out of contact with the ratchet wheel by a dog 70, and when the dog is released the pawl is brought into engagement with the teeth of the wheel by a spring 71.

Diagonal braces 22 and 23 may be connected with the side bars in any suitable manner, or in the manner indicated in my application, Serial No. 722,559.

The arch 40 is an important feature, and it consists of a main member connecting the body portion proper with the forward truck of the wagon and has connection with the side bars by means of an offset portion at the rear end, which portion is indicated by 41, and which is formed in such manner that it enters the channel between the flanges of the I-beam and is secured to the web. The portion constituting the base of the arch rises from this substantially horizontal portion and projects outwardly, in order to clear the edge of the upper flange of the I-beam, and extends thence upwardly and forwardly having its opposite end constituting the base of the arch on the other side and being connected with the structure at that point in a peculiar and novel manner.

A plurality of inwardly extending members 43, 44 and 45 are provided, each with sockets, which receive transverse members 46, 47 and 48 of the structure forming a part of the forward truck. The draft frame is indicated by 49 and the usual circular plates are indicated by 50 and 51.

The object of forming the arch with the offset portion is to provide an absolutely clear space for the lumber. The arch itself is formed sufficiently high to accommodate the forward wheels in making short turns, and this arch alone permits the hanging of the body in such manner as to allow the lumber to be dropped in one pile in the manner above described.

What I claim is:

1. In a wagon, a frame comprising a plurality of side bars, an arch member connected with each of said bars and with the forward truck of the wagon, said arch member having inwardly extending portions provided with sockets, and transverse members seated within said sockets and connected with the arch member on the opposite side of the wagon.

2. In a wagon, a frame comprising a plurality of side bars having channels in their outer portions, a plurality of arches, each of said arches having connection with one of said side bars in the aforesaid channel portion and being offset from the main axis of said side members, said arches each being provided with socket members extending inwardly therefrom, and means for connecting said socket members of the opposite arches.

3. In a wagon, a frame comprising a plurality of side bars, an arch connected with each of said bars and with the forward truck of the wagon, said arches being offset from the main axis of the side bars, portions extending substantially horizontally from the base of the arches and located adjacent to the web of each of the side bars and having connection with the latter, and means for connecting the forward portions of the arches with each other.

4. An arch member for a wagon body comprising an arch proper, a portion extending from the base thereof on one side in a substantially horizontal direction, and a portion extending from the base on the opposite side of the arch in a direction opposite to that of the horizontal portion first mentioned, and projecting members carried by the arch proper and by one of said horizontally extending portions, such projecting members being provided with sockets.

In testimony whereof I affix my signature in presence of two witnesses.

GABRIEL STREICH.

Witnesses:
  GEORGE H. MACDONALD,
  H. C. JOHNSON.

---

Copies of this patent may be obtained for five cents each, by addressing the "Commissioner of Patents, Washington, D. C."